United States Patent
Miyazaki

(10) Patent No.: US 8,420,720 B2
(45) Date of Patent: Apr. 16, 2013

(54) RUBBER COMPOSITION FOR CLINCH, CHAFER OR SIDEWALL, AND PNEUMATIC TIRE

(75) Inventor: Tatsuya Miyazaki, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 13/216,285

(22) Filed: Aug. 24, 2011

(65) Prior Publication Data

US 2012/0048443 A1    Mar. 1, 2012

(30) Foreign Application Priority Data

Aug. 25, 2010   (JP) ................................ 2010-188671

(51) Int. Cl.
*C08K 5/5398*   (2006.01)
(52) U.S. Cl.
USPC .......................................................... 524/137
(58) Field of Classification Search .................... 524/137
See application file for complete search history.

(56) References Cited

U.S. PATENT DOCUMENTS

| | | | |
|---|---|---|---|
| 5,770,632 A * | 6/1998 | Sekhar et al. ................ | 521/41.5 |
| 2008/0295934 A1 * | 12/2008 | Mafune et al. ............. | 152/152.1 |
| 2008/0314484 A1 * | 12/2008 | Nishioka et al. ........... | 152/209.1 |
| 2009/0133793 A1 * | 5/2009 | Bergman et al. ............. | 152/458 |
| 2012/0053263 A1 * | 3/2012 | Miyazaki ..................... | 523/156 |
| 2012/0083559 A1 * | 4/2012 | Costantini .................... | 524/122 |

FOREIGN PATENT DOCUMENTS

| | | |
|---|---|---|
| JP | 2000-313768 A | 11/2000 |
| JP | 2002-521516 A | 7/2002 |
| JP | 2004-238507 A | 8/2004 |
| JP | 2004-256792 A | 9/2004 |
| JP | 2006-63143 A | 3/2006 |
| JP | 2008-24913 A | 2/2008 |
| JP | 2009-19097 A | 1/2009 |
| JP | 2009-46578 A | 3/2009 |
| JP | 2009-84534 A | 4/2009 |
| JP | 2009-114427 A | 5/2009 |

* cited by examiner

*Primary Examiner* — Peter Szekely
(74) *Attorney, Agent, or Firm* — Birch, Stewart, Kolasch & Birch, LLP

(57) ABSTRACT

The present invention provides a rubber composition for a clinch, a chafer or a sidewall, which improves fuel economy, elongation at break, and abrasion resistance in good balance while maintaining good handling stability (hardness) and processability (extrusion processability) even if the amount of zinc oxide is decreased; and a pneumatic tire having a clinch, a chafer and/or a sidewall produced therefrom. The invention relates to a rubber composition for a clinch, a chafer or a sidewall, comprising: a rubber component; a compound represented by formula (I):

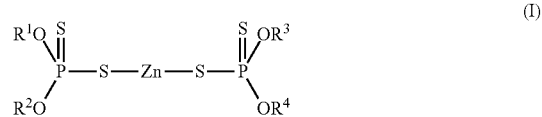

(I)

wherein $R^1$ to $R^4$ each independently represent a C1-18 linear or branched alkyl group or a C5-12 cycloalkyl group; and zinc oxide, wherein the amount of the compound represented by formula (I) is 0.2 to 6 parts by mass and the amount of the zinc oxide is 1.0 part by mass or less, for each 100 parts by mass of the rubber component.

5 Claims, No Drawings

RUBBER COMPOSITION FOR CLINCH, CHAFER OR SIDEWALL, AND PNEUMATIC TIRE

TECHNICAL FIELD

The present invention relates to a rubber composition for a clinch, a chafer or a sidewall; and a pneumatic tire produced using the same.

BACKGROUND ART

Rubber compositions used for a clinch, a chafer and a sidewall each of which comes into direct contact with a rim or curb are required to have excellent abrasion resistance and crack growth resistance. These rubber compositions are also required to have excellent handling stability (hardness), fuel economy, and elongation at break. In order to fulfill these requirements, for example, a rubber composition for a clinch, a chafer or a sidewall is used which includes a rubber component composed of natural rubber (NR) and butadiene rubber (BR), and contains zinc oxide typically in an amount of 2.5 to 5 parts by mass for each 100 parts by mass of the rubber component.

However, zinc oxide is an inorganic material difficult to disperse, and its use leads to poor abrasion resistance. Therefore, it is desirable to reduce the amount of zinc oxide. In addition, zinc oxide contained in tire rubber compositions has been regarded as a problem in recent years from the viewpoint of environmental pollution, and accordingly it is desired to reduce the amount of zinc oxide. However, the reduction in the amount of zinc oxide tends to cause reduction in hardness and deterioration of handling stability. Therefore, it has been practically difficult to reduce the amount of zinc oxide.

Other various attempts have been made to improve the handling stability (hardness), fuel economy, elongation at break, and abrasion resistance. For example, Patent Document 1 proposes a method of using VCR and a modified BR in combination as BR, Patent Document 2 proposes a method of using Tackirol V200 (produced by Taoka Chemical Co., Ltd.) as a hybrid crosslinking coagent, and Patent Document 3 proposes a method of optimizing the amounts of sulfur, vulcanization accelerator, and zinc oxide.

However, the techniques described in Patent Documents 1 to 3 have room for improvement in terms of improving fuel economy, elongation at break, and abrasion resistance in good balance while maintaining good handling stability (hardness) and processability (extrusion processability).

Patent Document 1: JP 2006-63143 A
Patent Document 2: JP 2009-84534 A
Patent Document 3: JP 2008-24913 A

SUMMARY OF THE INVENTION

The present invention solves the aforementioned problems, and has its object to provide a rubber composition for a clinch, a chafer or a sidewall, which improves fuel economy, elongation at break, and abrasion resistance in good balance while maintaining good handling stability (hardness) and processability (extrusion processability) even if the amount of zinc oxide is decreased; and a pneumatic tire having a clinch, a chafer and/or a sidewall produced therefrom.

The present invention relates to a rubber composition for a clinch, a chafer or a sidewall, comprising:
a rubber component;
a compound represented by formula (I):

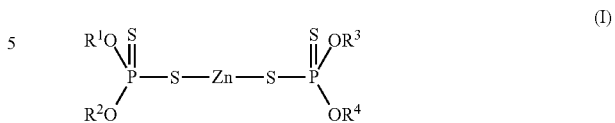

wherein $R^1$ to $R^4$ each independently represent a C1-18 linear or branched alkyl group or a C5-12 cycloalkyl group; and
zinc oxide,
wherein the amount of the compound represented by formula (I) is 0.2 to 6 parts by mass and the amount of the zinc oxide is 1.0 part by mass or less, for each 100 parts by mass of the rubber component.

The amount of the compound represented by formula (I) is preferably 0.4 to 6 parts by mass for each 100 parts by mass of the rubber component.

The rubber component preferably contains an isoprene-based rubber and butadiene rubber.

In respect of rolling resistance (fuel economy), the rubber composition preferably comprises silica in an amount of 5 to 40 parts by mass for each 100 parts by mass of the rubber component.

The present invention also relates to a pneumatic tire having a clinch, a chafer and/or a sidewall produced from the aforementioned rubber composition.

According to the present invention, the rubber composition for a clinch, a chafer or a sidewall comprises a specific amount of the compound represented by formula (I). The rubber composition therefore improves fuel economy, elongation at break, and abrasion resistance in good balance while maintaining good handling stability (hardness) and processability (extrusion processability) even if the amount of zinc oxide is decreased (to a predetermined amount or less). Thus, use of the rubber composition for a clinch, a chafer and/or a sidewall provides a pneumatic tire that improves fuel economy, durability, and abrasion resistance in good balance while maintaining good handling stability (hardness). In addition, since the rubber composition contains only a predetermined amount or less of zinc oxide, environmental pollution can be prevented.

BEST MODE FOR CARRYING OUT THE INVENTION

The rubber composition for a clinch, a chafer or a sidewall of the present invention (hereinafter, collectively also referred to as the rubber composition of the present invention) contains a specific amount of the compound represented by formula (I), and a predetermined amount or less of zinc oxide.

The compound represented by formula (I), which has a zinc atom at the center of the structure, shows an excellent crosslinking promotion effect, and is also excellent in dispersibility. In addition, zinc in the form of the compound represented by formula (I) does not form a mass like zinc oxide, but is finely dispersed in a molecular level. Therefore, addition of a specific amount of the compound represented by formula (I) makes it possible to form a uniform crosslinking even if the amount of zinc oxide is decreased (to a predetermined amount or less). As a result, the elongation at break, fuel economy, and abrasion resistance can be improved while maintaining good handling stability (hardness) and processability (extrusion processability).

In addition, as mentioned above, zinc in the form of the compound represented by formula (I) is finely dispersed in a molecular level and thus has no adverse effect on abrasion resistance. Addition of the specific amount of the compound represented by formula (I) also makes it possible to decrease (to a predetermined amount or less) the amount of zinc oxide that, as a foreign matter or an agglomerated mass, has adverse effect on performances (in particular, abrasion resistance). Therefore, not only environmental pollution but also reduction in abrasion resistance can be prevented.

That is, the rubber composition of the present invention improves fuel economy, elongation at break, and abrasion resistance in good balance while maintaining good handling stability (hardness) and processability (extrusion processability) even if the amount of zinc oxide is decreased.

It should be noted that zinc methacrylate has good dispersibility but has a crosslinking promotion effect inferior to that of the compound represented by formula (I), and in this case the abovementioned performances cannot be sufficiently improved.

The mechanisms of the crosslinking promotion effect of the compound represented by formula (I) are not clear, but the following mechanisms a) and b) are presumable. a) The compound represented by formula (I) is bonded to silica (a hydroxy group of silica), and mediates the bonding between a silane coupling agent and silica. b) The compound represented by formula (I) is highly dispersed in the rubber composition, is bonded to a vulcanization (crosslinking) accelerator, and mediates the bonding between the vulcanization accelerator and the rubber component.

DPG, which is a vulcanization accelerator preferably used in a silica-containing rubber composition, is known to have the effect a). In the case of replacing DPG with the compound represented by formula (I), the compound exhibits performance superior to DPG, which means that the mechanism a) may be involved. Meanwhile, when the compound represented by formula (I) is added, a similar hardness can be secured even if the amount of vulcanization accelerator is decreased, and the performance can be improved even without a silane coupling agent, which means that the mechanism b) may also probably be involved. The compound represented by formula (I) has a molecular chain of an appropriate length and has low polarity. Thus, the compound has a structure capable of easily dispersing in rubber polymers and easily coming close to a vulcanization accelerator. The aforementioned effects are presumably due to such a structure of the compound represented by formula (I).

In formula (I), $R^1$ to $R^4$ each independently represent a C1-18 linear or branched alkyl group or a C5-12 cycloalkyl group. Examples of the linear or branched alkyl group for $R^1$ to $R^4$ include a methyl group, an ethyl group, an n-propyl group, an iso-propyl group, an n-butyl group, a 4-methylpentyl group, a 2-ethylhexyl group, an octyl group, and an octadecyl group. Examples of the cycloalkyl group include a cyclopentyl group, a cyclohexyl group, and a cyclooctyl group.

Among these, $R^1$ to $R^4$ are each preferably a C2-8 linear or branched alkyl group, and more preferably an n-butyl group, an n-propyl group, an iso-propyl group, or an n-octyl group, from the viewpoints of high dispersibility in rubber and easy production.

Examples of the compound represented by formula (I) include TP-50 and ZBOP-50 (produced by Rhein Chemie), and other compounds similar to these products (for example, $R^1$ to $R^4$ are each an n-propyl group, an iso-propyl group, or an n-octyl group).

The amount (amount of active ingredient) of the compound represented by formula (I) is 0.2 parts by mass or more, preferably 0.4 parts by mass or more, and more preferably 0.8 parts by mass or more, for each 100 parts by mass of the rubber component. If the amount is less than 0.2 parts by mass, the effects of the compound represented by formula (I) tend not to be sufficiently exerted.

The amount is 6 parts by mass or less, preferably 5 parts by mass or less, and more preferably 4 parts by mass or less, for each 100 parts by mass of the rubber component. If the amount exceeds 6 parts by mass, the scorch time is likely to be short, and the extrusion processability tends to deteriorate.

Since the compound represented by formula (I) has an excellent crosslinking promotion effect, the amount of zinc oxide can be decreased in the rubber composition of the present invention. Therefore, in the rubber composition of the present invention, the amount of zinc oxide is 1.0 part by mass or less, preferably 0.5 parts by mass or less, more preferably 0.3 parts by mass or less, further preferably 0.1 parts by mass or less, and most preferably 0 parts by mass (zinc oxide free), for each 100 parts by mass of the rubber component. In these cases, the compound represented by formula (I) is highly dispersed in rubber, and then is more likely to be bonded to a vulcanization accelerator, which results in further improvement in abrasion resistance. This is presumed to be because a sulfur atom or a zinc atom is released from the compound represented by formula (I) to form a complex with the vulcanization accelerator; but in the case of adding zinc oxide, a zinc atom is less likely to be released from the compound represented by formula (I).

Examples of rubbers that can be used in the present invention include diene rubbers such as isoprene-based rubbers, butadiene rubber (BR), styrene butadiene rubber (SBR), styrene isoprene butadiene rubber (SIBR), ethylene propylene diene rubber (EPDM), chloroprene rubber (CR), and acrylonitrile butadiene rubber (NBR). Each of these may be used alone, or two or more kinds thereof may be used in combination. In particular, isoprene-based rubbers and BR are preferable, and a combination of an isoprene-based rubber and BR is more preferable, because they provide excellent abrasion resistance, handling stability (hardness), fuel economy, and elongation at break, which are required for a clinch, a chafer and a sidewall.

In the case where a combination of an isoprene-based rubber and BR is used as the rubber component, the performance-improving effects of the compound represented by formula (I) are enhanced compared with the case where SBR, for example, is used alone as the rubber component.

Examples of the isoprene-based rubber include synthetic isoprene rubber (IR), natural rubber (NR), and modified natural rubber. Examples of the NR include deproteinized natural rubber (DPNR) and highly purified natural rubber (HPNR), and examples of the modified natural rubber include epoxidized natural rubber (ENR), hydrogenated natural rubber (HNR), and grafted natural rubber. Specific examples of the NR include products generally used in the tire industry, such as SIR20, RSS#3, and TSR20. Among these examples, NR and IR are preferable, and NR is more preferable.

The amount of isoprene-based rubber is preferably 10% by mass or more, and more preferably 20% by mass or more, based on 100% by mass of the rubber component. An amount of less than 10% by mass may result in poor elongation at break. The amount of isoprene-based rubber is preferably 50% by mass or less, and more preferably 40% by mass or less, based on 100% by mass of the rubber component. An amount exceeding 50% by mass may lead to poor abrasion resistance.

The BR is not particularly limited, and examples thereof include BRs generally used in the tire industry, including BRs with a high cis content such as BR1220 (produced by ZEON Corporation), BR130B and BR150B (both produced by UBE INDUSTRIES, LTD.), and 1,2-syndiotactic polybutadiene crystal (SPB)-containing BRs such as VCR412 and VCR617 (both produced by UBE INDUSTRIES, LTD.). Tin-modified butadiene rubber (tin-modified BR) obtained by modification with a tin compound may also be used. In particular, BRs with a cis content of 95% by mass or more are preferable because of their excellent abrasion resistance and crack growth resistance. Also, a combination of SPB-containing BR and tin-modified BR is preferable in terms of improving fuel economy and abrasion resistance in good balance.

In respect of the SPB-containing BR, preferably, the SPB crystals are not simply dispersed in BR, but are chemically bonded to BR and thereby dispersed. The dispersion (orientation (arrangement)) of the crystals chemically bonded to the rubber component tends to further improve abrasion resistance and extrusion processability.

The SPB has a melting point of preferably 180° C. or higher, and more preferably 190° C. or higher. If the melting point is lower than 180° C., the crystals tend to melt during the press vulcanization of a tire, likely leading to a decrease in hardness. The SPB has a melting point of preferably 220° C. or lower, and more preferably 210° C. or lower. If the melting point exceeds 220° C., the SBR-containing BR tends to have a larger molecular weight, and therefore have poor dispersibility in the rubber composition.

In the SPB-containing BR, the SPB content is 2.5% by mass or more, and preferably 10% by mass or more. If the SPB content is less than 2.5% by mass, the hardness of the rubber composition tends not to be sufficient. In the SPB-containing BR, the SPB content is 20% by mass or less, and preferably 18% by mass or less. If the SPB content exceeds 20% by mass, the SPB-containing BR is less likely to be dispersed in the rubber composition, and the processability (extrusion processability) tends to deteriorate.

Here, the SPB content in the SPB-containing BR refers to the amount of a boiling n-hexane insoluble matter.

The tin-modified BR may be prepared by polymerization of 1,3-butadiene with a lithium initiator, followed by addition of a tin compound. The tin-modified BR preferably has a tin-carbon bond at a molecular end thereof. Use of the tin-modified BR contributes to decrease in Tg (glass transition temperature) of the polymers, and to formation of a strong bonding between filler such as carbon black and the polymers.

Examples of the lithium initiator include lithium compounds such as alkyllithium, aryllithium, allyllithium, vinyllithium, organotin-lithium, and organonitrogen-lithium compounds. By using a lithium compound as the initiator, a tin-modified BR with a high vinyl content and a low cis content can be produced.

Examples of the tin compound include: tin tetrachloride, butyltin trichloride, dibutyltin dichloride, dioctyltin dichloride, tributyltin chloride, triphenyltin chloride, diphenyldibutyltin, triphenyltin ethoxide, diphenyldimethyltin, ditolyltin chloride, diphenyltin dioctanoate, divinyldiethyltin, tetrabenzyltin, dibutyltin distearate, tetraallyltin, and p-tributyltin styrene. Each of these may be used alone, or two or more kinds thereof may be used in combination.

The tin-atom content in the tin-modified BR is 50 ppm or more, and preferably 60 ppm or more. If the content is less than 50 ppm, the dispersibility of carbon black in the tin-modified BR may not be sufficiently enhanced and the tan δ may increase. The tin-atom content is 3000 ppm or less, preferably 2500 ppm or less, and more preferably 250 ppm or less. If the content is more than 3000 ppm, the resulting kneaded mixture is less likely to come together and may not provide a uniform edge profile, so that the extrusion processability of the kneaded mixture may deteriorate.

The molecular weight distribution (Mw/Mn) of the tin-modified BR is 2 or less, and preferably 1.5 or less. It is undesirable that the Mw/Mn is more than 2 because, in such case, the dispersibility of carbon black deteriorates and the tan δ increases.

In the present invention, the number average molecular weight (Mn) and the weight average molecular weight (Mw) are determined relative to polystyrene standards by gel permeation chromatography (GPC).

The vinyl bond content in the tin-modified BR is 5% by mass or more, and preferably 7% by mass or more. If the vinyl bond content is less than 5% by mass, the polymerization (production) of the tin-modified BR is difficult. The vinyl bond content is 50% by mass or less, and preferably 20% by mass or less. If the vinyl bond content is more than 50% by mass, the dispersibility of carbon black tends to be poor and the tensile strength tends to weaken.

The amount of BR is preferably 50% by mass or more, and more preferably 60% by mass or more, based on 100% by mass of the rubber component. An amount of less than 50% by mass may result in poor abrasion resistance. The amount of BR is preferably 90% by mass or less, and more preferably 80% by mass or less, based on 100% by mass of the rubber component. An amount exceeding 90% by mass may lead to poor processability and elongation at break.

In the case where the SPB-containing BR and the tin-modified BR are used in combination, the amount of the SPB-containing BR is preferably 30 to 50% by mass based on 100% by mass of the rubber component.

Also, the amount of the tin-modified BR is preferably 20 to 40% by mass based on 100% by mass of the rubber component.

If the amounts of the SPB-containing BR and the tin-modified BR are in these ranges, the fuel economy and abrasion resistance can be improved in better balance.

The total amount of isoprene-based rubber and BR is preferably 80% by mass or more, more preferably 90% by mass or more, and further preferably 100% by mass, based on 100% by mass of the rubber component. If the total amount is less than 80% by mass, the effects of the present invention may not be sufficiently exerted.

Silica is preferably used in the present invention. The use of silica leads to less heat build-up and high rubber strength, and thereby improved fuel economy and elongation at break. Combined use of the compound represented by formula (I) and silica can optimize the initial curing rate, and synergistically improve fuel economy and elongation at break. Generally, the use of the compound represented by formula (I) increases the initial curing rate. The combined use of the compound represented by formula (I) with silica can optimize the initial curing rate. This is presumably because the curing rate can be slowed down by the use of silica, whose surface is acidic.

The silica is not particularly limited. Examples thereof include dry silica (silicic anhydride) and wet silica (hydrous silicic acid). Wet silica is preferable because it has more silanol groups.

The nitrogen adsorption specific surface area ($N_2SA$) of silica is preferably 40 $m^2/g$ or more, and more preferably 100 $m^2/g$ or more. If the $N_2SA$ is less than 40 $m^2/g$, the elongation at break tends to decrease. The $N_2SA$ of silica is preferably 220 $m^2/g$ or less, and more preferably 200 $m^2/g$ or less. If the $N_2SA$ is more than 220 $m^2/g$, the fuel economy and extrusion processability tend to deteriorate.

Here, the nitrogen adsorption specific surface area of silica is determined by the BET method in accordance with ASTM D3037-81.

The amount of silica is preferably 5 parts by mass or more, more preferably 7 parts by mass or more, and further preferably 10 parts by mass or more, for each 100 parts by mass of the rubber component. If the amount is less than 5 parts by mass, the rolling resistance (fuel economy) and elongation at break tend not to be sufficiently improved. The amount of silica is preferably 40 parts by mass or less, more preferably 30 parts by mass or less, and further preferably 25 parts by mass or less, for each 100 parts by mass of the rubber component. If the amount exceeds 40 parts by mass, the abrasion resistance and extrusion processability tend to deteriorate.

The silica is preferably used in combination with a silane coupling agent. As the silane coupling agent, any silane coupling agent conventionally used in combination with silica in the rubber industry may be used. Examples thereof include: sulfide-type silane coupling agents such as bis(3-triethoxysilylpropyl)disulfide and bis(3-triethoxysilylpropyl)tetrasulfide; mercapto-type silane coupling agents such as 3-mercaptopropyltrimethoxysilane; vinyl-type silane coupling agents such as vinyltriethoxysilane; amino-type silane coupling agents such as 3-aminopropyltriethoxysilane; glycidoxy-type silane coupling agents such as γ-glycidoxypropyltriethoxysilane; nitro-type silane coupling agents such as 3-nitropropyltrimethoxysilane; and chloro-type silane coupling agents such as 3-chloropropyltrimethoxysilane. Each of these may be used alone, or two or more kinds thereof may be used in combination. Among these, sulfide-type silane coupling agents are preferable, and bis(3-triethoxysilylpropyl)disulfide is more preferable.

The amount of silane coupling agent is preferably 2 parts by mass or more, and more preferably 5 parts by mass or more, for each 100 parts by mass of silica. If the amount is less than 2 parts by mass, the elongation at break tends to significantly decrease. The amount of silane coupling agent is preferably 15 parts by mass or less, and more preferably 10 parts by mass or less, for each 100 parts by mass of silica. If the amount exceeds 15 parts by mass, the effects of the silane coupling agent, such as improvement in elongation at break and reduction in rolling resistance (improvement in fuel economy), tend not to be exerted.

The rubber composition may contain carbon black. In this case, better reinforcement is obtained, and the handling stability (hardness), elongation at break, and abrasion resistance can be further improved. Examples of the carbon black include those generally used in the tire industry such as GPF, HAF, ISAF, and SAF.

In the case where the carbon black is used for the rubber composition for a clinch or a chafer, the carbon black has a nitrogen adsorption specific surface area ($N_2SA$) of preferably 40 $m^2/g$ or more, and more preferably 60 $m^2/g$ or more. If the $N_2SA$ is less than 40 $m^2/g$, the reinforcement may not be sufficient, and the handling stability (hardness), elongation at break, and abrasion resistance may not be sufficiently improved. The carbon black has an $N_2SA$ of preferably 120 $m^2/g$ or less, and more preferably 90 $m^2/g$ or less. If the $N_2SA$ exceeds 120 $m^2/g$, the extrusion processability and fuel economy tend to deteriorate.

In the present description, the $N_2SA$ of carbon black is determined by the method A of page 7 in JIS K6217.

In the case where the carbon black is used for the rubber composition for a sidewall, the carbon black has a nitrogen adsorption specific surface area ($N_2SA$) of preferably 10 $m^2/g$ or more, and more preferably 20 $m^2/g$ or more. If the $N_2SA$ is less than 10 $m^2/g$, the reinforcement may not be sufficient, and the handling stability (hardness), elongation at break, and abrasion resistance may not be sufficiently improved. The carbon black has an $N_2SA$ of preferably 60 $m^2/g$ or less, and more preferably 50 $m^2/g$ or less. If the $N_2SA$ exceeds 60 $m^2/g$, the fuel economy tends to deteriorate.

In the case of using the carbon black for the rubber composition for a sidewall, the silica is preferably used with the carbon black. In this case, tires (tires for passenger vehicles, and tires for trucks and buses) excellent in fuel economy are obtained.

The total amount of carbon black and silica is preferably 25 parts by mass or more, and more preferably 30 parts by mass or more, for each 100 parts by mass of the rubber component. If the total amount is less than 25 parts by mass, the reinforcement may not be sufficient, and the handling stability (hardness), elongation at break, and abrasion resistance may not be sufficiently improved. The total amount is preferably 80 parts by mass or less, and more preferably 70 parts by mass or less, for each 100 parts by mass of the rubber component. If the total amount exceeds 80 parts by mass, the fuel economy tends to deteriorate.

In addition to the above-mentioned ingredients, the rubber composition of the present invention may optionally contain a compounding ingredient commonly used in production of rubber compositions. Examples of the compounding ingredient include: reinforcing fillers such as clay; stearic acid; various antioxidants; oils such as aromatic oils; waxes; vulcanizing agents such as sulfur; vulcanization accelerators; and vulcanization accelerator aids.

It is preferable to decrease the amount of sulfur in order to improve abrasion resistance. However, if the amount of sulfur in a rubber composition for a clinch, a chafer or a sidewall is decreased, the adhesion of a rubber composition for covering a carcass cord (case) adjacent to a clinch, a chafer or a sidewall to the code covered by the rubber composition decreases, and thus the tire durability decreases. Hence, the amount of sulfur cannot be reduced. This mechanism is presumably that if the amount of sulfur in a rubber composition for a clinch, a chafer or a sidewall is decreased, sulfur migrates from the rubber composition for covering a carcass cord to the clinch, chafer or sidewall rubber composition during the vulcanization, and as a result, the adhesion of the rubber composition for covering a carcass cord to the code covered by the rubber composition decreases. Therefore, in the rubber composition of the present invention, the amount of sulfur is preferably 1.5 to 2.5 parts by mass for each 100 parts by mass of the rubber component.

Examples of the vulcanization accelerator include: sulfenamide vulcanization accelerators such as N-tert-butyl-2-benzothiazolylsulfenamide (TBBS), N-cyclohexyl-2-benzothiazolylsulfenamide (CBS), and N,N-dicyclohexyl-2-benzothiazolylsulfenamide (DZ); mercaptobenzothiazole (MBT); dibenzothiazolyldisulfide (MBTS); and diphenylguanidine (DPG). Among these, sulfenamide vulcanization accelerators are preferable and TBBS is more preferable because they are excellent in curing properties, and lead to less heat build-up of the vulcanized rubber composition and less scorch.

Since the compound represented by formula (I) is highly active, addition of the compound tends to cause rubber scorch (discoloration) easily in the kneading step and increase the crosslink density. Therefore, it is preferable to decrease the amount of vulcanization accelerator in the rubber composition of the present invention. Specifically, the amount of vulcanization accelerator is preferably 2.2 parts by mass or less, more preferably 1.8 parts by mass or less, and further preferably 1.4 parts by mass or less, for each 100 parts by mass of the rubber component. An amount exceeding 2.2 parts by mass may reduce the elongation at break. The amount of vulcanization accelerator is preferably 0.5 parts by mass or more, and more preferably 0.6 parts by mass or more, for each 100 parts by mass of the rubber component. An amount of less than 0.5 parts by mass may result in poor handling stability (hardness Hs).

Preferable examples of the vulcanization accelerator aid (vulcanization retarder) include N-cyclohexylthiophthalimide (Retarder CTP produced by Ouchi Shinko Chemical Industrial Co., Ltd., and Retarder PVI produced by Monsanto Company) which can slow down the curing rate and prevent scorching. It is preferable to add 0.3 parts by mass or less of N-cyclohexylthiophthalimide for each 100 parts by mass of the rubber component. An amount of N-cyclohexylthiophthalimide exceeding 0.3 parts by mass may cause blooming in processing, likely resulting in lower adhesiveness and decreased adhesion to other rubber compositions.

The rubber composition of the present invention may be used for a clinch, a chafer and/or a sidewall.

The clinch used herein refers to a component made of a rubber composition provided at the radially inner portion of the sidewall, and the chafer refers to a component provided at the bead area contacting at least a rim. Documents such as JP 2010-163560 A (FIG. 1) show specific examples of the clinch and chafer.

The rubber composition of the present invention may be produced by a known method. For example, the rubber composition may be produced by mixing and kneading the above-mentioned ingredients with a rubber kneader such as a Banbury mixer or an open roll mill.

The pneumatic tire of the present invention may be produced by a usual method with the rubber composition of the present invention. More specifically, tire components such as a clinch, a chafer and/or a sidewall are produced using the rubber composition, assembled with other tire components, and heated and pressurized on a tire building machine, whereby a pneumatic tire is produced.

The pneumatic tire of the present invention can be used for passenger vehicles, trucks/buses, light trucks, and the like. The pneumatic tire of the present invention is excellent in handling stability (hardness), fuel economy, durability (in particular, overload durability), and abrasion resistance. The pneumatic tire of the present invention may be a run-flat tire. In the case of applying the rubber composition of the present invention to a run-flat tire, the obtained run-flat tire is excellent in handling stability (hardness), fuel economy, durability (in particular, run-flat durability), and abrasion resistance.

EXAMPLES

The present invention will be more specifically described based on examples, but the present invention is not limited to these examples.

In the following, the respective chemical agents used in Examples and Comparative Examples are listed.

BR (1): BR150B produced by Ube Industries, Ltd. (high-cis BR, cis content: 97% by mass)

BR (2): BR1250H produced by ZEON Corporation (tin-modified BR, prepared by polymerization with lithium as initiator, vinyl bond content: 10 to 13% by mass, Mw/Mn: 1.5, tin-atom content: 250 ppm)

BR (3): VCR617 produced by Ube Industries, Ltd. (high-cis BR, 1,2-syndiotactic polybutadiene crystal (SPB) dispersion, 1,2-syndiotactic polybutadiene crystal content (amount of boiling n-hexane insoluble matter): 17% by mass, melting point of 1,2-syndiotactic polybutadiene crystals: 200° C.)

NR: TSR20

Silica (1): Z115Gr produced by Rhodia Japan ($N_2SA$: 112 $m^2$/g)

Silica (2): Ultrasil VN3 produced by Evonik Degussa ($N_2SA$: 175 $m^2$/g)

Carbon black: N330 produced by Mitsubishi Chemical Corporation ($N_2SA$: 78 $m^2$/g)

Oil: Vivatec 500 produced by H&R (TDAE oil)

Wax: Sunnoc N produced by Ouchi Shinko Chemical Industrial Co., Ltd.

Antioxidant: Antigene 6C (6PPD) produced by Sumitomo Chemical Co., Ltd.

Stearic acid: Stearic acid produced by NOF Corporation

Zinc oxide: Zinc oxide produced by Mitsui Mining & Smelting Co., Ltd.

Silane coupling agent: Si266 produced by Evonik Degussa (bis(3-triethoxysilylpropyl)disulfide)

Sulfur: SEIMI sulfur produced by NIPPON KANRYU INDUSTRY CO., LTD. (insoluble sulfur with carbon disulfide-insoluble content of 60% or more, oil content: 10%)

Vulcanization accelerator TBBS: Nocceler NS (N-tert-butyl-2-benzothiazolylsulfenamide) produced by Ouchi Shinko Chemical Industrial Co., Ltd.

Crosslinking coagent V200: Tackirol V200 produced by Taoka Chemical Co., Ltd.

Crosslinking coagent SDT-50: SDT-50 produced by Rhein Chemie (compound represented by following formula, $R^{12}$ to $R^{15}$: 2-ethylhexyl group, x: 1 or more, amount of active ingredient: 50% by mass)

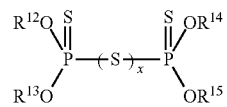

Crosslinking coagent TP-50: TP-50 produced by Rhein Chemie (compound represented by formula (I), $R^1$ to $R^4$: n-butyl group, amount of active ingredient: 50% by mass)

Crosslinking coagent ZBOP-50: ZBOP-50 produced by Rhein Chemie (compound represented by formula (I), $R^1$ to $R^4$: alkyl group, amount of active ingredient: 50% by mass)

Crosslinking coagent (Vulcanization retarder) PVI: Retarder PVI (N-cyclohexylthiophthalimide) produced by Monsanto Company Examples 1 to 12 and Comparative Examples 1 to 10

According to the respective formulations shown in Tables 1 and 2, the chemical agents other than sulfur, vulcanization accelerator, and crosslinking coagents were mixed and kneaded with a 1.7-L Banbury mixer so as to give a temperature of 180° C., and thus a kneaded mixture was obtained. Subsequently, to the resulting kneaded mixture were added the sulfur, vulcanization accelerator, and crosslinking coagent(s) and then kneaded with an open two-roll mill so as to give a temperature of 105° C., and thus an unvulcanized rubber composition was produced.

The obtained unvulcanized rubber composition was press-vulcanized at 170° C. for 12 minutes to provide a vulcanized rubber composition.

Also, the obtained unvulcanized rubber composition was processed into clinch, chafer, and sidewall shapes, and they were assembled with other tire components, and vulcanized at 170° C. for 12 minutes to provide a test tire (tire size: 225/40R18 88Y).

The following evaluations were made on the produced unvulcanized rubber compositions, vulcanized rubber compositions, and test tires. Tables 1 and 2 show the results.

(Handling Stability (Hs))

In conformity with JIS K6253, the hardness of each vulcanized rubber composition was measured with a hardness meter at a temperature of 25° C. (Shore-A measurement). A lager value means higher hardness and better handling stability.

(Fuel Economy)

The tan δ of each vulcanized rubber composition was determined with a viscoelasticity spectrometer VES (produced by Iwamoto Seisakusho Co., Ltd.) under the following conditions: a temperature of 70° C.; an initial strain of 10%; and a dynamic strain of 2%. A smaller tan δ value means lower rolling resistance (better fuel economy).

(Tensile Test)

A No. 3 dumbbell specimen prepared from each vulcanized rubber composition was subjected to a tensile test at room temperature in accordance with JIS K 6251 "Rubber, vulcanized or thermoplastic—Determination of tensile stress-strain properties" and the elongation at break (EB) (%) was measured. A larger EB value means higher tensile strength.

(Abrasion Resistance (Rim Slippage))

Each test tire was run on a test drum at a speed of 20 km/h for 400 hours under the conditions of a 230% load of the maximum load (maximum internal pressure conditions) specified in JIS. Then, the abrasion depth of the rim flange contact area was measured. The rim slippage index of Comparative Example 1 was regarded as 100, and the abrasion depth of each formulation was expressed as an index value by the following equation. A larger rim slippage index value means less rim slippage and better abrasion resistance.

(Rim slippage index)=(Abrasion depth of Comparative Example 1)/(Abrasion depth of each formulation)×100

(Extrusion Processability)

Each unvulcanized rubber composition was passed through a cold feed extruder, and the rubber scorch resistance, the edge irregularities and the dimensional stability of the extrudate were evaluated.

AAA: particularly excellent, AA: excellent, A: good, B: reduced productivity and uniformity, C: substantially reduced productivity, and D: very poor (disadvantageous in production)

TABLE 1

| | | Comparative Examples | | | | | | | | | |
|---|---|---|---|---|---|---|---|---|---|---|---|
| | | 1 | 2 | 3 | 4 | 5 | 6 | 7 | 8 | 9 | 10 |
| Formulation (part(s) by mass) | BR(1) | 70 | 70 | 70 | — | 70 | 70 | 70 | 70 | 70 | 70 |
| | BR(2) | — | — | — | 30 | — | — | — | — | — | — |
| | BR(3) | — | — | — | 40 | — | — | — | — | — | — |
| | NR | 30 | 30 | 30 | 30 | 30 | 30 | 30 | 30 | 30 | 30 |
| | Silica (1) | — | — | — | — | — | — | — | — | — | — |
| | Silica (2) | — | — | — | — | — | — | 10 | — | — | — |
| | Carbon black | 65 | 65 | 65 | 60 | 65 | 65 | 60 | 65 | 65 | 65 |
| | Oil | 8 | 8 | 8 | 8 | 8 | 8 | 8 | 8 | 8 | 8 |
| | Wax | 1.5 | 1.5 | 1.5 | 1.5 | 1.5 | 1.5 | 1.5 | 1.5 | 1.5 | 1.5 |
| | Antioxidant | 3 | 3 | 3 | 3 | 3 | 3 | 3 | 3 | 3 | 3 |
| | Stearic acid | 2 | 2 | 2 | 2 | 2 | 2 | 2 | 2 | 2 | 2 |
| | Zinc oxide | 2.5 | 0.5 | 2.5 | 2.5 | 1.5 | 2.5 | 2.5 | 2.5 | 1.5 | 1.5 |
| | Silane coupling agent | — | — | — | — | — | — | — | — | — | — |
| | Sulfur | 2.3 | 2.3 | 1.8 | 2.3 | 2.3 | 3 | 2.3 | 1.8 | 2.3 | 2.3 |
| | Vulcanization accelerator TBBS | 2 | 3.5 | 3.5 | 2 | 3 | 0.9 | 2 | 2 | 0.8 | 0.8 |
| | Crosslinking coagent V200 | — | — | — | — | — | — | — | 4 | — | — |
| | Crosslinking coagent SDT-50 | — | — | — | — | — | — | — | — | 2 | — |
| | Crosslinking coagent TP-50 | — | — | — | — | — | — | — | — | — | 0.2 |
| | Crosslinking coagent ZBOP-50 | — | — | — | — | — | — | — | — | — | — |
| | Crosslinking coagent PVI | — | — | — | — | — | — | — | 0.3 | — | — |
| Performance evaluation | Handling stability (Hs) | 71 | 70 | 71 | 72 | 71 | 71 | 70 | 72 | 72 | 70 |
| | Fuel economy (tan δ) | 0.148 | 0.16 | 0.128 | 0.115 | 0.121 | 0.161 | 0.122 | 0.119 | 0.131 | 0.144 |
| | Elongation at break (EB) | 280 | 260 | 260 | 295 | 250 | 335 | 320 | 240 | 280 | 295 |
| | Abrasion resistance (rim slippage) | 100 | 107 | 104 | 115 | 101 | 92 | 93 | 89 | 106 | 105 |
| | Extrusion processability | A | A | A | AA | A | A | AA | C | A | A |

TABLE 2

| | | Examples | | | | | | |
|---|---|---|---|---|---|---|---|---|
| | | 1 | 2 | 3 | 4 | 5 | 6 | 7 |
| Formulation (part(s) by mass) | BR(1) | 70 | 70 | 70 | — | 70 | 70 | 70 |
| | BR(2) | — | — | — | 30 | — | — | — |
| | BR(3) | — | — | — | 40 | — | — | — |
| | NR | 30 | 30 | 30 | 30 | 30 | 30 | 30 |
| | Silica (1) | — | — | — | — | — | — | — |
| | Silica (2) | — | — | — | — | — | — | — |
| | Carbon black | 65 | 65 | 65 | 60 | 65 | 65 | 65 |
| | Oil | 8 | 8 | 8 | 8 | 8 | 8 | 8 |
| | Wax | 1.5 | 1.5 | 1.5 | 1.5 | 1.5 | 1.5 | 1.5 |
| | Antioxidant | 3 | 3 | 3 | 3 | 3 | 3 | 3 |
| | Stearic acid | 2 | 2 | 2 | 2 | 2 | 2 | 2 |
| | Zinc oxide | — | 0.5 | — | — | — | — | — |
| | Silane coupling agent | — | — | — | — | — | — | — |
| | Sulfur | 2.3 | 2.3 | 1.8 | 2.3 | 2.3 | 1.6 | 2.3 |
| | Vulcanization accelerator TBBS | 0.8 | 0.8 | 0.8 | 0.8 | 0.8 | 0.5 | 1.2 |
| | Crosslinking coagent V200 | — | — | — | — | — | — | — |
| | Crosslinking coagent SDT-50 | — | — | — | — | — | — | — |
| | Crosslinking coagent TP-50 | 2 | 2 | 4 | 2 | — | 8 | 1 |
| | Crosslinking coagent ZBOP-50 | — | — | — | — | 2 | — | — |
| | Crosslinking coagent PVI | — | — | 0.2 | — | — | 0.3 | — |

TABLE 2-continued

| | | | | | | | | |
|---|---|---|---|---|---|---|---|---|
| Performance evaluation | Handling stability (Hs) | 72 | 72 | 73 | 72 | 72 | 72 | 72 |
| | Fuel economy (tan δ) | 0.121 | 0.129 | 0.114 | 0.095 | 0.122 | 0.111 | 0.129 |
| | Elongation at break (EB) | 330 | 310 | 355 | 330 | 325 | 370 | 310 |
| | Abrasion resistance (rim slippage) | 135 | 130 | 145 | 150 | 135 | 145 | 115 |
| | Extrusion processability | A | A | A | AA | A | A | A |

| | | Examples | | | | |
|---|---|---|---|---|---|---|
| | | 8 | 9 | 10 | 11 | 12 |
| Formulation (part(s) by mass) | BR(1) | 70 | 70 | 70 | — | — |
| | BR(2) | — | — | — | 30 | 30 |
| | BR(3) | — | — | — | 40 | 40 |
| | NR | 30 | 30 | 30 | 30 | 30 |
| | Silica (1) | — | — | 25 | — | — |
| | Silica (2) | 10 | 15 | — | — | 10 |
| | Carbon black | 60 | 50 | 50 | 60 | 55 |
| | Oil | 8 | 8 | 8 | 8 | 8 |
| | Wax | 1.5 | 1.5 | 1.5 | 1.5 | 1.5 |
| | Antioxidant | 3 | 3 | 3 | 3 | 3 |
| | Stearic acid | 2 | 2 | 2 | 2 | 2 |
| | Zinc oxide | — | — | — | — | — |
| | Silane coupling agent | 0.8 | 1.2 | 2 | — | — |
| | Sulfur | 2.3 | 1.8 | 1.6 | 1.8 | 2.3 |
| | Vulcanization accelerator TBBS | 0.8 | 0.8 | 0.5 | 1.6 | 0.8 |
| | Crosslinking coagent V200 | — | — | — | — | — |
| | Crosslinking coagent SDT-50 | — | — | — | — | — |
| | Crosslinking coagent TP-50 | 2 | 4 | 8 | 2 | 2 |
| | Crosslinking coagent ZBOP-50 | — | — | — | — | — |
| | Crosslinking coagent PVI | — | 0.2 | — | — | — |
| Performance evaluation | Handling stability (Hs) | 71 | 73 | 72 | 73 | 73 |
| | Fuel economy (tan δ) | 0.108 | 0.088 | 0.082 | 0.089 | 0.077 |
| | Elongation at break (EB) | 350 | 385 | 375 | 320 | 375 |
| | Abrasion resistance (rim slippage) | 125 | 105 | 100 | 160 | 135 |
| | Extrusion processability | A | A | A | AA | AAA |

Tables 1 and 2 show that in Examples in which a specific amount of the compound represented by formula (I) and a predetermined amount or less of zinc oxide were used, the fuel economy, elongation at break, and abrasion resistance were improved in good balance while good handling stability (hardness) and extrusion processability were maintained. In contrast, in Comparative Examples in which the specific amount of the compound represented by formula (I) was not used, performances were inferior to those in Examples.

The invention claimed is:

1. A pneumatic tire comprising at least one of a clinch, a chafer, and a sidewall that are prepared using a rubber composition for a clinch, a chafer, or a sidewall, said rubber composition comprising:
a rubber component which contains an isoprene-based rubber and butadiene rubber;
a compound represented by formula (I):

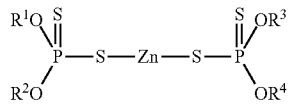

wherein $R^1$ to $R^4$ each independently represent a C1-18 linear or branched alkyl group or a C5-12 cycloalkyl group, in an amount of 0.2 to 6 parts by mass for each 100 parts by mass of the rubber component; and
zinc oxide in an amount of 1.0 part by mass or less for each 100 parts by mass of the rubber component.

2. The pneumatic tire according to claim 1,
wherein the amount of the compound represented by formula (I) is 0.4 to 6 parts by mass for each 100 parts by mass of the rubber component.

3. The pneumatic tire according to claim 1,
wherein the rubber composition comprises silica in an amount of 5 to 40 parts by mass for each 100 parts by mass of the rubber component.

4. The pneumatic tire according to claim 1,
wherein the butadiene rubber has a cis content of 95% by mass or more.

5. The pneumatic tire according to claim 1,
comprising a 1,2-syndiotactic polybutadiene crystal-containing butadiene rubber and a tin-modified butadiene rubber.

* * * * *